United States Patent [19]

Narita

[11] Patent Number: 5,729,327
[45] Date of Patent: Mar. 17, 1998

[54] PHOTOGRAPHIC PRINTER FOR FORMING INDEX PRINTS

[75] Inventor: Toshihiko Narita, Kanagawa, Japan

[73] Assignee: Fuji Photo Film Co., Ltd., Kanagawa, Japan

[21] Appl. No.: 664,621

[22] Filed: Jun. 18, 1996

[30] Foreign Application Priority Data

Jul. 31, 1995 [JP] Japan .................. 7-194923

[51] Int. Cl.⁶ .................................................. G03B 27/52
[52] U.S. Cl. .................................................. 355/40
[58] Field of Search .................. 355/27, 32, 39, 355/40, 67

[56] References Cited

U.S. PATENT DOCUMENTS

| | | | |
|---|---|---|---|
| 4,903,068 | 2/1990 | Shiota | 355/40 X |
| 4,933,773 | 6/1990 | Shiota et al. | 358/302 |
| 5,432,580 | 7/1995 | Tokuda | 355/27 X |
| 5,563,984 | 10/1996 | Tanibata | 355/40 X |
| 5,583,610 | 12/1996 | Yoshikawa | 355/40 X |

FOREIGN PATENT DOCUMENTS

| | | | |
|---|---|---|---|
| 1-96634 | 4/1989 | Japan | G03B 27/32 |
| 7-17261 | 2/1995 | Japan | G03B 27/32 |

*Primary Examiner*—Fred L. Braun
*Attorney, Agent, or Firm*—Sughrue, Mion, Zinn, Macpeak & Seas, PLLC

[57] ABSTRACT

A photographic printer has a main exposure section which successively prints, onto a photographic printing paper, images of a plurality of image frames recorded on a developed photographic film; and a secondary exposure section for forming, on a sheet-shaped photographic printing paper, an index print in which the images recorded on the plurality of image frames are arranged lengthwise and breadthwise. The photographic printer includes, as a light source for exposure of the index print, a high luminance reflecting type LED which emits parallel light of a blue color component of light, a high luminance reflecting type LED which emits parallel light of a red color component of light, and a high luminance reflecting type LED which emits parallel light of a green color component of light. The photographic printer also includes a liquid crystal panel on which light from the high luminance reflecting type LEDs is incident, and which exposes the photographic printing paper. Accordingly, there is no need for a lens to make parallel the light from the high luminance reflecting type LEDs.

12 Claims, 3 Drawing Sheets

PARALLEL LIGHT REGION

PARALLEL LIGHT REGION

MIRROR SURFACE

LIGHT EMITTING ELEMENT

PHOTOGRAPHIC PRINTER FOR FORMING INDEX PRINTS

BACKGROUND OF THE INVENTION

1. Field of the Invention

The present invention relates to a photographic printer which successively positions, at a printing position, image frames recorded on a photographic film which has been developed, and which prints transmitted images onto a photographic printing paper.

2. Description of the Related Art

Index prints, on which frames are printed at reduced sizes in a matrix form, have conventionally been known as a way of easily determining what photographs have been photographed on a roll of a developed negative film. An index print is created as follows. At a photographic printer, the image data of the respective frames of a negative film, which image data are read by a predetermined scanner, are stored in a predetermined image memory. Image data of several frames are read from the image memory and are displayed on a liquid crystal panel at a predetermined timing. The displayed images of the several frames are then exposed onto a photographic printing paper so as to form the index print.

An LED light source, which generates R, G, B colors, is used as the light source for the image exposure which is carried out by using the liquid crystal panel. In this way, there is no need for a filter for color-separation of the white light into the respective colors R, G, B. Therefore, the structure of the device can be simplified, and the setting of conditions such as the respective color balances and the like is facilitated.

However, if the light from the light source, i.e., the light illuminated from the LED, is not made into parallel light, the light cannot be transmitted through the pixels of the liquid crystal panel due to the properties of the liquid crystal panel. Therefore, in a case in which a resin lens type LED, which is available for purchase on the market, is used, an optical system such as a lens or the like must be disposed on the optical path. Further, the efficiency of such a resin lens type LED is unsatisfactory as it can only utilize a portion of the light which has been emitted from the light emitting element in all directions.

U.S. Pat. No. 4,933,773, Japanese Patent Application Publication (JP-B) No. 8-7383, and Japanese Patent Application No. 7-17261 are related art of the present application. Note that Japanese Patent Application No. 7-17261 is pending at the Japanese Patent Office, and is not publicly known at the time of filing of the present application.

SUMMARY OF THE INVENTION

In view of the aforementioned, an object of the present invention is to provide a photographic printer in which there is no need to place a lens or the like on the optical path in order to make parallel the exposure light transmitted through the respective pixels of a liquid crystal panel, and in which almost all of the light emitted from a light emitting element can be used efficiently.

A first aspect of the present invention is a photographic printer having: a main exposure section which successively positions at a printing position a plurality of image frames recorded on a developed photographic film, and prints transmitted images onto a photographic printing paper; and a secondary exposure section for forming, on a sheet, an index print in which images, which are recorded on the plurality of image frames, are arranged lengthwise and breadthwise, the secondary exposure section comprising: storing means for reading image data of the plurality of image frames positioned successively at the printing position, and for storing the image data; editing means for editing, to a predetermined format, the image data of the plurality of image frames which image data is stored in the storing means; a liquid crystal panel in which pixels, whose transmission density is changeable in predetermined gradations, are arranged in a matrix form; display control means for color-separating each image of the plurality of image frames into an R color density, a G color density and a B color density in accordance with the image data edited by the editing means, and for displaying the R color density, the G color density and the B color density on the liquid crystal panel; and a light source section emitting R, G and B colors which are transmitted through respective pixels of the liquid crystal panel and which are used for exposing a transmitted image onto the sheet.

In accordance with the first aspect, an image is displayed on the liquid crystal panel on the basis of the density data for R, G and B. By superposing and exposing the density data of the three colors, a color image is obtained.

Because the light source emits light per color R, G and B, there is no need to place a filter or the like on the optical path. Further, the correction at the time of exposure at the main exposure section is included in the stored image data. Therefore, the image displayed on the liquid crystal panel is of necessity a normal image, and accordingly, there is no need to set conditions such as the color balance or the like.

A second object of the present invention is a photographic printer having: a first exposure section which successively prints, onto a photographic printing paper, images of a plurality of image frames recorded on a developed photographic film; and a second exposure section for forming, on a sheet-shaped photographic printing paper, an index print in which the images, which are recorded on the plurality of image frames, are arranged lengthwise and breadthwise, the second exposure section comprising: storing means for reading, from the first exposure section, image data of the plurality of image frames, and for storing the image data; editing means for editing, to a predetermined format, the image data of the plurality of image frames which image data is stored in the storing means; a liquid crystal panel in which a plurality of pixels, whose transmission density is changeable in predetermined gradations, are arranged in a matrix form; display control means for color-separating each image of the plurality of image frames into an R color density, a G color density and a B color density in accordance with the image data edited by the editing means, and for displaying the R color density, the G color density and the B color density on the liquid crystal panel; and a light source section emitting R, G and B colors which are transmitted through respective pixels of the liquid crystal panel and which are used for exposing a transmitted image onto the sheet-shaped photographic printing paper.

DESCRIPTION OF THE PREFERRED EMBODIMENT

Figure 1:
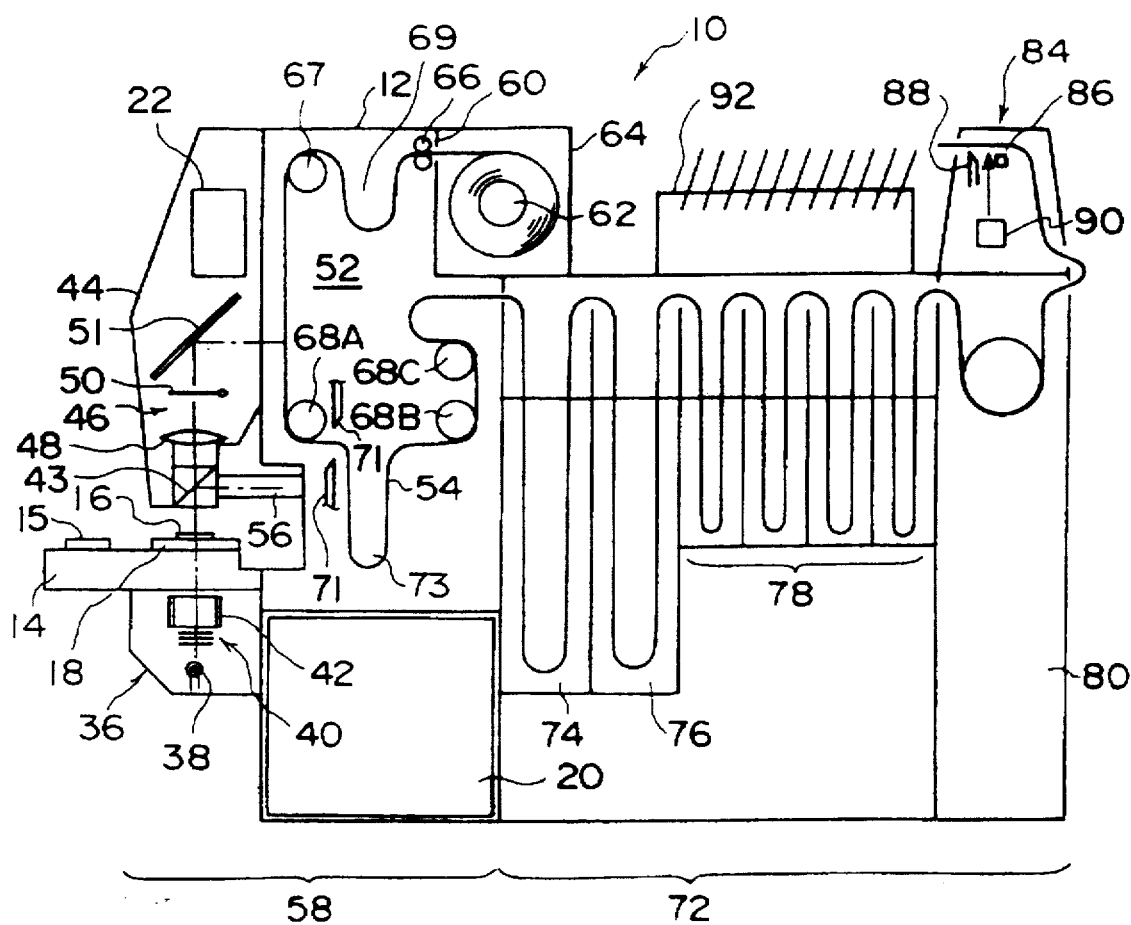
FIG. 1 is a schematic structural view of a printer processor relating to the present embodiment.

An embodiment of the present invention will be described hereinafter with reference to the accompanying drawings.

The structure of a printer processor 10 of the embodiment of the present invention will be described with reference to FIGS. 1 and 2. The exterior of the printer processor 10 is covered by a casing 12. The printer processor 10 includes a printer section 58, which effects main printing exposure and secondary printing exposure onto photographic printing papers, and a processor section 72, which effects developing, fixing, rinsing and drying processings for exposed photographic printing papers.

First, the structure of the printer section 58 will be described. An operation table 14, which projects out from the casing 12 toward the left in FIG. 1, is disposed at the printer processor 10. A negative carrier 18, on which a negative film 18 is set, and a keyboard 15, which is used by an operator to input commands, data, or the like, are disposed on the top surface of the operation table 14.

A main exposure light source section 36 is disposed beneath the operation table 14. A light source 38 is provided in the main exposure light source section 36. The light emitted from the light source 38 passes through a color correction filter 40 (hereinafter, "CC filter 40") and a diffusion tube 42, and reaches the negative film 16 set on the negative carrier 18. The CC filter 40 is formed by a C (cyan) filter, an M (magenta) filter, and a Y (yellow) filter. These respective filters are operated under the control of a CC filter control section 39 so as to be able to be inserted on and withdrawn from the optical axis of the light emitted from the light source 38.

Figure 2:
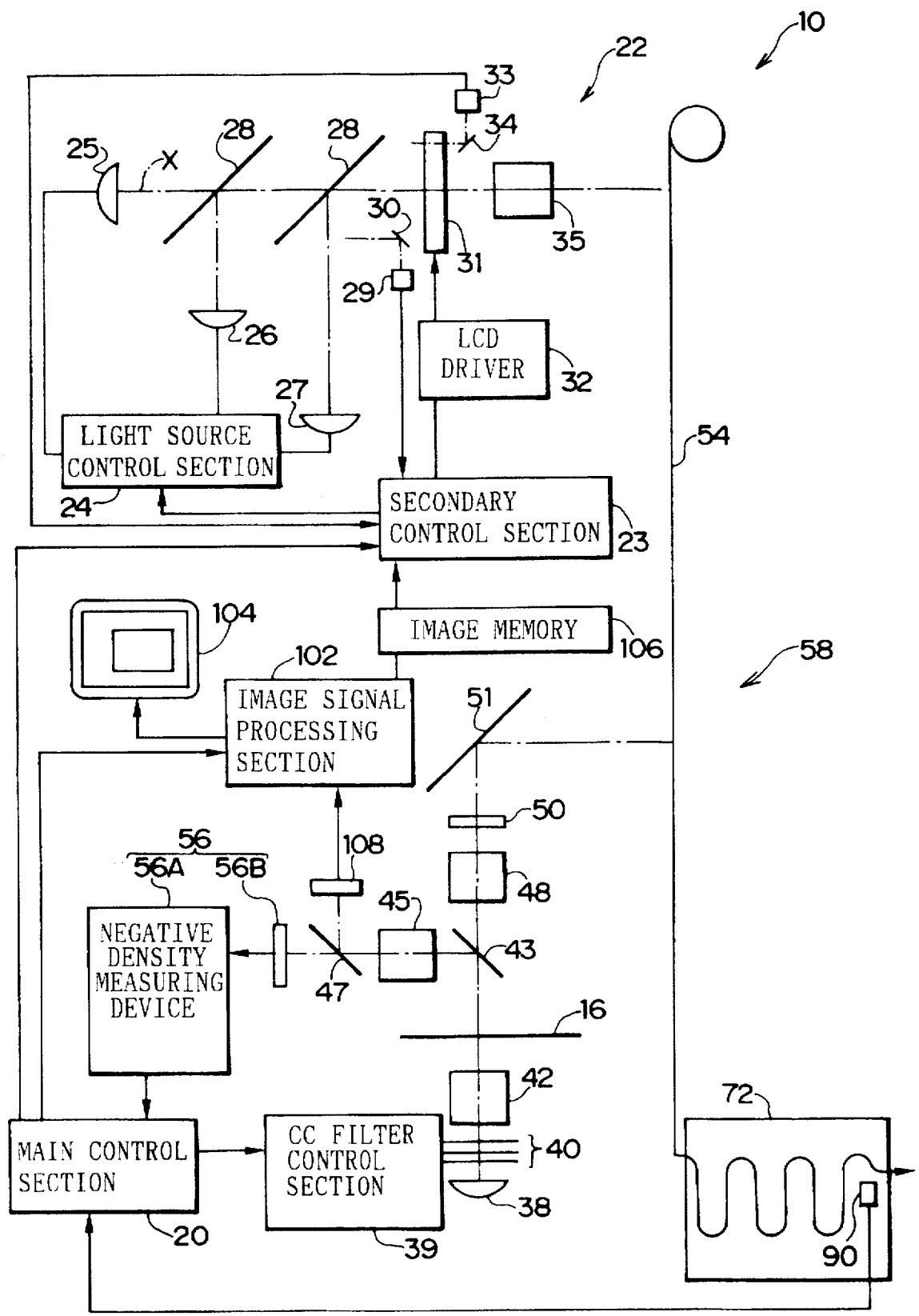
FIG. 2 is a block view illustrating a structure of a printer section of the printer processor.

An arm 44 is provided at the downstream side of the negative carrier 18 (i.e., above the negative carrier 18 in FIG. 1). A main exposure optical system 46 and a secondary printing section 22, which exposes secondary prints such as index prints or the like, are provided within the arm 44.

A half mirror 43 is disposed at the lowest portion of the main exposure optical system 46. The light transmitted through the negative film 16 set on the negative carrier 18 reaches the half mirror 43. An exposure lens 48 and a black shutter 50 are disposed in that order at the downstream side of the half mirror 43 on the optical path of the light transmitted through the half mirror 43. The exposure lens 48 changes the magnification of the image to be exposed, and the black shutter 50 is used to shade the exposure light. A mirror 51, which reflects the exposure light substantially orthogonally, is disposed downstream of the black shutter 50. The exposure light reflected by the mirror 51 is illuminated onto a photographic printing paper 54 which is set in an exposure chamber 52. In this way, exposure of the photographic printing paper 54 is effected.

A lens 45 for photometry, which changes the magnification of the image for photometry, is disposed downstream of the half mirror 43 on the optical path of the light reflected by the half mirror 43. A half mirror 47 is disposed at the downstream side of the lens 45 for photometry. A scanner 108 formed by an image sensor or the like is disposed in the direction in which light is reflected by the half mirror 47. An image signal processing section 102, which effects a predetermined image processing with respect to the image data of respective frames of the negative film 16 read by the scanner 108, is connected to the scanner 108.

A simulator 104 serving as an image display device is connected to the image signal processing section 102. Simulated images of prints, which are to be prepared on the basis of set conditions, are displayed on the simulator 104 for the images of the respective frames of the negative film 16.

An image memory 106 for storing image data is connected to the image signal processing section 102. The image signal processing section 102 stores in the image memory 106 the image data of the respective frames of the negative film 16 read by the scanner 108.

A negative density measuring section 56 for measuring the image density of each frame of the negative film 16 is provided downstream of the half mirror 47 on the optical path of the light transmitted through the half mirror 47. A scanner 56B and a negative density measuring device 56A are disposed at the negative density measuring section 56. The scanner 56B is formed by an image sensor or the like. The negative density measuring device 56A measures the image density of each frame of the negative film 16 read by the scanner 56B.

A light emitting diode 25 (hereinafter "B-LED") which emits the blue component of light, a light emitting diode 26 (hereinafter "R-LED") which emits the red component, and a light emitting diode 27 (hereinafter "G-LED") which emits the green component are provided in the secondary printing section 22. The B-LED 25, the R-LED 26, and the G-LED 27 serve as a light source for index print exposure, and are controlled by a light source control section 24. The B-LED 25 is disposed on the exposure optical axis X. Two dichroic mirrors 128 are disposed at the downstream side of the B-LED 25 in the direction in which the light emitted from the B-LED 25 proceeds. The dichroic mirrors 28 make the optical axis of the red color light emitted from the R-LED 26 and the optical axis of the green color light emitted from the G-LED 27 coincide with the exposure optical axis X.

The LEDs 25, 26, 27 used in the present embodiment are high luminance reflecting type LEDs, and their structure is different than that of the resin type LED which is generally used.

More specifically, in a resin type LED, a light emitting element is embedded in the bottom portion of a resin lens which is formed in a bullet shape or a rectangular block shape, and light is emitted from the lens. In contrast, in a high luminance reflecting type LED, the side of a rectangular block shaped light emitting element opposite the light emitting surface thereof is oriented toward the irradiating surface of the LED, and a paraboloidal mirror surface is disposed so as to oppose the light emitting surface of the light emitting element. The light emitting surface is disposed at the focal point position of the mirror surface. As a result, the light emitted from the light emitting surface becomes parallel light when reflected at the mirror surface, and is irradiated from the irradiating surface.

Therefore, almost all of the light emitted from the light emitting surface can be used effectively as exposure light.

A mirror 30 is disposed further downstream than the dichroic mirrors 28 in the direction in which the light proceeds, at the final end of the optical path (a position which does not effect the images). A light source light amount sensor 29 for measuring the amount of light emitted from the light source is disposed in the direction in which light is reflected by the mirror 30.

A liquid crystal panel 31 is disposed downstream of the position at which the mirror 30 is disposed, in a plane which is orthogonal to the exposure optical axis X. A plurality of pixels, which can display black, white and intermediate colors thereof due to an electrical means, are arranged systematically at an image display surface 31A of the liquid crystal panel 31. The liquid crystal panel 31 can display 256 gradations. A liquid crystal panel driver 32, which drives the liquid crystal panel 31, is connected thereto. A secondary control section 23, which observes and controls respective processing conditions at the secondary printing section 22, is connected to the liquid crystal panel driver 32. The secondary control section 23 is formed by a CPU, RAM, ROM, input/output controller and the like (all unillustrated), and is connected to the image memory 106 via the input/output controller.

The secondary control section 23 reads the image data of the respective frames of the negative film 16 which image data are stored in the image memory 106, and in accordance with a predetermined rule, forms index image data for the one roll of film on which the frame images are disposed. Images corresponding to image data of a predetermined number of frames among the formed index image data for one roll of film, e.g., images corresponding to image data of five frames (one row), are displayed on the liquid crystal panel 31 by the liquid crystal panel driver 32. Further, images corresponding to image data of only R or G or B color components among the image data for one row can be displayed on the liquid crystal panel 31.

A mirror 34 is disposed downstream of the position at which the liquid crystal panel 31 is disposed, at the final end of the exposure path (i.e., at a position which does not effect the images). A transmitted light amount sensor 33, which measures the amount of light transmitted through the liquid crystal panel 31, is disposed in the direction in which light is reflected by the mirror 34.

An exposure lens 35, which changes the magnification of the secondary print images to be exposed, is disposed downstream of the position at which the mirror 34 is provided. The index print image, which is displayed on the liquid crystal panel 31 and projected by the exposure light, is formed on the photographic printing paper 54 at a predetermined magnification by the exposure lens 35.

The light source control section 24, the light source light amount sensor 29, and the transmitted light amount sensor 33, which have all been mentioned previously, are connected to the secondary control section 23. The secondary control section 23 computes an appropriate correction amount of the light amount on the basis of the light amount values for R, G, B respectively which were measured by the light source light amount sensor 29. The light amounts of the lights emitted from the B-LED 25, the R-LED 26, and the G-LED 27 are corrected by the light source control section 24. Similarly, on the basis of the transmitted light amount values measured by the transmitted light amount sensor 33, the secondary control section 23 controls the liquid crystal panel driver 32 and adjusts the densities of the images displayed on the liquid crystal panel 31 so that appropriate transmitted light amounts are obtained.

A main control section 20, which functions in the same way as the secondary control section 23 and effects monitoring and control of the entire printer processor 10, is disposed below the exposure chamber 52. The main control section 20 is formed by a CPU, RAM, ROM, input/output controller and the like (all unillustrated). The CC filter control section 39, the negative density measuring device 56A, the image signal processing section 102, and the secondary control section 23 are connected to the main control section 20 such that the main control section 20 monitors and controls the operations of these respective structural devices.

A loading section 60 is provided in a corner portion formed by the upper portion of the right side surface of the arm 44 and the upper surface of the casing 12. A paper magazine 64, in which the photographic printing paper 54 is accommodated in a state of being taken up in roll form on a reel 62, is loaded into the loading section 60.

A roller pair 66 is disposed in a vicinity of the loading section 60, and nips the photographic printing paper 54 to convey the same in a horizontal state to the exposure chamber 52. The photographic printing paper 54 is entrained around a roller 67, which is disposed at the loading section 60 side of the arm 44, such that the direction of the photographic printing paper 54 is changed by 90 degrees and the photographic printing paper 54 is conveyed downwardly. A first stock section 69 is provided between the roller and the roller 67, and guides and stocks the photographic printing paper 54 in a substantial U-shape.

Rollers 68A, 68B, 68C are disposed under the exposure portion of the exposure chamber 52. The direction of the photographic printing paper 54, on which the images of the negative film 16 have been printed in the exposure chamber 52, is changed substantially 90 degrees by each of the rollers 68A, 68B, 68C. The photographic printing paper 54 is then conveyed to the processor section 72.

A cutter 71 is provided downstream of the roller 68A, and cuts the trailing end of the photographic printing paper 54 for which exposure processing has been completed. The portion of the photographic printing paper 54 which remains in the exposure chamber 52 after cutting by the cutter can be rewound into the paper magazine 64. Further, a second stock section 73 is provided between the roller 68A and the roller 68B. The photographic printing paper 54 which has been subjected to printing processing is guided and stocked in a substantial U-shape in the second stock section 73. By stocking the photographic printing paper 54 in the second stock section 73, the difference in the processing times of the printer section 58 and the processor section 72 can be absorbed.

Next, the structure of the processor section 72 will be described. A color developing processing tank 74 which holds color developing processing solution, a bleaching/fixing processing tank 76 which holds bleaching/fixing processing solution, and a plurality of rinsing processing tanks 78 which hold rinsing processing solution, are provided in the processor section 72. Developing, fixing and rinsing processing are successively effected by the photographic printing paper 54 being conveyed successively through the color developing processing tank 74, the bleaching/fixing processing tank 76, and the plurality of rinsing processing tanks 78. The photographic printing paper 54 which has been subjected to rinsing processing is conveyed to a drying section 80 which is adjacent to the rinsing processing tanks 78. In the drying section 80, the photographic printing paper 54 is entrained about a roller and exposed to high temperature air so as to be dried.

The photographic printing paper 54 is nipped by an unillustrated pair of rollers so as to be conveyed out of the drying section 80 at a constant speed after drying processing has been completed. A cutter section 84 is provided downstream of the drying section 80. The cutter section 84 is provided with a cut mark sensor 86 which senses cut marks applied to the photographic printing paper 54, a paper density measuring section 90 which measures the density of the photographic printing paper 54, and a cutter 88 which cuts the photographic printing paper 54. The cut mark sensor 86, the paper density measuring section 90, and the cutter 88 are connected to the main control section 20. In the cutter section 84, the photographic printing paper 54 is cut per image frame by the cutter 88, such that photographic prints are obtained.

The photographic prints are discharged to a sorter section 92 where they are sorted and where a predetermined inspection operation is carried out. Inferior prints, such as blurred prints or the like, are removed during the inspection operation. Thereafter, the normal photographic prints are given to the customer together with the negative film.

Operation of the present embodiment will now be described. First, main print exposure processing at the printer section 58 of the printer processor 10 will be explained. With the black shutter 50 closed, the negative film 16 on which are recorded images to be printed is set at the negative carrier 18, and the light source 38 is lit. The density of the image of the negative film 16 which is imaged by the light transmitted through the negative film 16 is measured by the negative density measuring section 56. Appropriate exposure conditions (e.g., the amount of insertion of the respective filters of the filter section 40 onto the optical path, or the like) are set by the main control section 20 on the basis of the measured density of the image of the negative film 16. Next, the black shutter 50 is opened, and the image of the negative film 16 is exposed onto the photographic printing paper 54 on the basis of the set exposure conditions.

Secondary print exposure processing at the printer section 58 will be explained for a case in which an image frame which is the same as that of the main print is exposed at the secondary printing section 22. The negative film 16, on which are recorded images to be printed, is set at the negative carrier 18, and the light source 38 is lit. The image of the negative film 16 imaged by the light transmitted through the negative film 16 is read by the scanner 108. The read image data is stored in the image memory 106 by the image signal processing section 102. Image data is read from the image memory 106 by the secondary control section 23. In order to image the blue color component of the image data (hereinafter, "blue image") onto the photographic printing paper 54, an image corresponding to the blue image is displayed on the liquid crystal panel 31, and the B-LED 25 is illuminated for an amount of time corresponding to the set exposure conditions. In this way, the blue image of the image data is exposed onto the photographic printing paper 54. Thereafter, in the same way, the red color component of the image data (the "red image") and the green color component of the image data (the "green image") are displayed on the liquid crystal panel 31, the R-LED 26 and G-LED 27 are illuminated, and the red image and green image of the image data are exposed onto the photographic printing paper 54, respectively. In this way, the image to be printed is exposed onto the photographic printing paper 54.

Processing at the processor section 72 will now be described. After the image to be printed has been exposed onto the photographic printing paper 54 as described above, the photographic printing paper 54 is conveyed successively through the color developing processing tank 74, the bleaching/fixing processing tank 76, and the plurality of rinsing processing tanks 78 so that developing processing, fixing processing and rinsing processing of the photographic printing paper 54 are carried out successively. The photographic printing paper 54 which has been subjected to rinsing processing is conveyed into the drying section 80, and undergoes drying processing by warm temperature air. The photographic printing paper 54 which has been subjected to drying processing is conveyed into the cutter section 84 where it is cut per image frame by the cutter 88, so that photographic prints are formed. The photographic prints are discharged to the sorter section 90, and are sorted thereat.

Here, the LEDs of the secondary printing section 22 applied to the present embodiment are high luminance reflecting type LEDs. Because the light emitted therefrom is parallel light, there is no need to provide a lens on the optical path as is needed in a case in which a resin lens type LED which emits diffused light is used. Therefore, the structure of the photographic printer is simplified.

Further, because almost all of the light emitted from the light emitting elements is reflected at mirror surfaces and irradiated, the amount of light can be obtained efficiently.

The following are examples of structures for utilizing the parallel light as exposure light as described above.

The above light source is characterized in that light within a predetermined region from the center of the light, which is reflected by the paraboloidal mirror surface, is used as the exposure light.

More specifically, the periphery at which the light becomes non-uniform due to the existence of the electrodes is shaded so that the light emitting region is restricted to around the center where the light is uniform. In this way, light of a uniform light amount can be used as the exposure light.

Japanese Patent Application Laid-Open (JP-A) No. 7-180297, whose applicant is the same as that of the present application, discloses an improved LED light source. Use of this improved LED light source as the back light of the liquid crystal panel of the present invention results in even more superior effects. Therefore, this improved LED light source will be briefly described hereinafter.

In the R-LED 26 and the G-LED 27, the pair of electrodes for energizing the light emitting element are provided at the light emitting surface and at the center of the surface opposite the light emitting surface. The light emitted from the light emitting surface is irradiated in a uniform amount around the center. Therefore, almost all of this light is used as the exposure light.

The configurations of the electrodes of the B-LED 25 are slightly different than those of the R-LED 26 and G-LED 27. In the B-LED 25, the pair of electrodes are disposed at the light emitting surface side, the proportion of the surface area of the light emitting surface occupied by the electrodes is large, and the configuration of the light emitting surface is not uniform around the center.

Figure 3A:
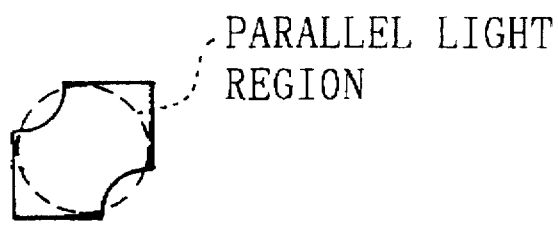
FIG. 3A is a projected view at a time when a light emitting element is at a focal point position.
Figure 3B:
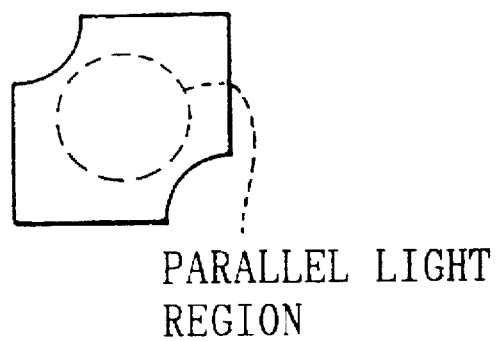
FIG. 3B is a projected view at a time when the light emitting element is offset from the focal point position.

In this state, use of all of the emitted light as the exposure light results in irregularities in the exposure amount, which is not appropriate for exposure light (see FIG. 3A). Therefore, in the present embodiment, the light emitting element of the B-LED 25 is offset from the focal point position of the mirror surface (i.e., the light emitting element is set closer to the mirror surface), and the region of the irradiated light is enlarged. As a result, although the periphery of the light is diffused light, light in a predetermined region from the center is maintained parallel as before (see FIG. 3B). By using only the light in this region, which light is maintained parallel, as the exposure light, the portion in which the light amount is non-uniform due to the electrodes is removed.

As a structure for shifting the light emitting element of the B-LED 25 from the focal point position of the mirror surface, a dummy block member may be provided between the light emitting element and the lead frame which fixes the light emitting element (the wire for energizing the electrodes), or the configuration of the light emitting element may be changed from the initial design.

Because the parallel light regions irradiated by the R-LED 26 and the G-LED 27 are uniform around the center, irregularities in the light amount do not occur.

Because the structure of the light emitting element of the B-LED 25 is slightly different than those of the R-LED 26 and the G-LED 27 (i.e., because the pair of electrodes are provided at the light emitting surface side in the B-LED 25), the region of irradiated light is not uniform around the center if the B-LED 25 is left as is. Accordingly, the light emitting element of the B-LED 25 is shifted from the focal point position of the mirror surface, and the irradiated light is diffused. In this case, the periphery of the irradiated light is diffused light, but the light in the predetermined region around the center is, as before, maintained parallel. By utilizing the light of this region, which is maintained as parallel light, as the exposure light (see FIG. 3B), irregularities in the light amount, which are caused by the non-uniformity of the configuration of the light emitting surface due to the electrodes, can be prevented.

Figure 3C:
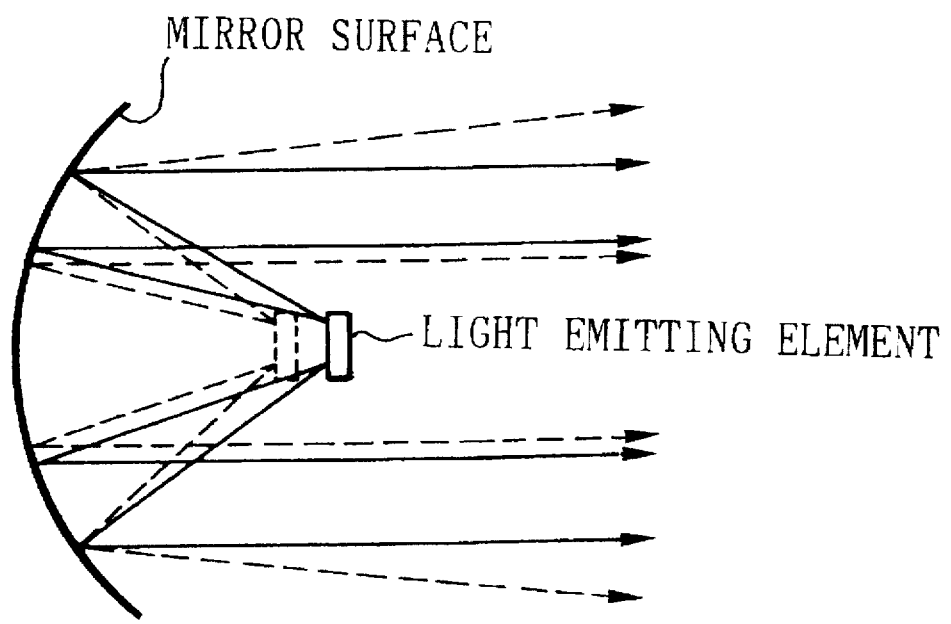
FIG. 3C is a theoretical view illustrating a characteristic of light reflected at a mirror surface.

FIG. 3C illustrates the principles of the present embodiment. When the light emitting element is disposed at the focal point position (the solid line position), all of the light reflected by the mirror surface is parallel light. When the light emitting element is at a position which is offset from the focal point position (refer to the chain line in the figure), the light at the center portion is maintained as parallel light, but the light becomes diffused light toward the outer sides. In the present embodiment, this central portion in which the light is maintained parallel (the circle formed by the chain line in FIG. 3B) is used as the exposure light.

In the present embodiment, by moving the position of the light emitting element from the focal point position of the reflecting mirror, irregularities in the light amount due to the unevenness of the configuration of the light emitting surface are prevented. However, the light emitting surface having the electrodes can be oriented in the opposite direction so as to not face the reflecting mirror, such that light emitted from the surface which is opposite the usual light emitting surface is reflected at the reflecting mirror. Further, a mask having a circular hole of a predetermined radius may be adhered so as to shade the periphery of the light emitting surface having the electrodes, at which periphery the electrodes are located. Moreover, the electrodes themselves may be placed uniformly around the center of the light emitting surface and the light emitting surface covered with a transparent, diffusing resin so that the emitted light is diffused.

In this way, the relative positions of the mirror surface and the light emitting element are chosen so that only the light within a predetermined region of the emitted light is parallel light. In a case in which all of the irradiated light is parallel light, the light emitting surface must be set at the focal point position of a paraboloidal mirror surface. However, if the light emitting surface is set at the focal point position, a portion of the periphery of the light image will be missing due to the electrodes such that the configuration of the light image will be non-uniform around the light emitting center. Therefore, the image of the emitted light will be non-uniform around the center.

By shifting the relative positions of the mirror surface and the light emitting element, the image can be enlarged. As a result, the region of parallel light becomes smaller, the light around the center becomes uniform, and irregularities in the amount of light of the exposure light can be prevented.

What is claimed is:

1. A photographic printer having:
    a main exposure section which successively positions at a printing position a plurality of image frames recorded on a developed photographic film, and prints transmitted images onto a photographic printing paper; and
    a secondary exposure section for forming, on a sheet, an index print in which images, which are recorded on the plurality of image frames, are arranged lengthwise and breadthwise,
    said secondary exposure section comprising:
        storing means for reading image data of the plurality of image frames positioned successively at the printing position, and for storing the image data;
        editing means for editing, to a predetermined format, the image data of the plurality of image frames which image data is stored in said storing means;
        a liquid crystal panel in which pixels, whose transmission density is changeable in predetermined gradations, are arranged in a matrix form;
        display control means for color-separating each image of the plurality of image frames into an R color density, a G color density and a B color density in accordance with the image data edited by said editing means, and for displaying the R color density, the G color density and the B color density on said liquid crystal panel; and
        a light source section emitting R, G and B colors which are transmitted through respective pixels of said liquid crystal panel and which are used for exposing a transmitted image onto the sheet.

2. A photographic printer according to claim 1, wherein said light source section includes a first high luminance reflecting type LED which emits B color, a second high luminance reflecting type LED which emits R color, and a third high luminance reflecting type LED which emits G color.

3. A photographic printer according to claim 2, wherein the high luminance reflecting type LED has a light emitting element and a paraboloidal mirror surface which reflects light from the light emitting element.

4. A photographic printer according to claim 3, wherein the light emitting element has a light emitting surface, and in the first high luminance reflecting type LED, the light-emitting surface is disposed at a position which is offset from a focal point position of the mirror surface so that a central portion of light reelected from the mirror surface is parallel light.

5. A photographic printer according to claim 4, wherein said secondary exposure section further comprises:
    an exposure lens which projects, as exposure light and onto the sheet, light transmitted through said liquid crystal panel, and which images the light at a predetermined magnification.

6. A photographic printer according to claim 2, wherein the first high luminance reflecting type LED is disposed on an exposure optical axis of said liquid crystal panel so as to emit light along said exposure optical axis, and said secondary exposure section further comprises first and second dichroic mirrors which are disposed on said exposure optical axis so as to correspond to the second high luminance reflecting type LED and the third high luminance reflecting type LED, and the second high luminance reflecting type LED and the third high luminance reflecting type LED are disposed so as to emit light in a direction orthogonal to said exposure optical axis, and the respective lights emitted from the second high luminance reflecting type LED and the third high luminance reflecting type LED are incident on said liquid crystal panel along said exposure optical axis via the first and second dichroic mirrors.

7. A photographic printer having:
a first exposure section which successively prints, onto a photographic printing paper, images of a plurality of image frames recorded on a developed photographic film; and
a second exposure section for forming, on a sheet-shaped photographic printing paper, an index print in which the images, which are recorded on the plurality of image frames, are arranged lengthwise and breadthwise,
said second exposure section comprising:
storing means for reading, from said first exposure section, image data of the plurality of image frames, and for storing the image data;
editing means for editing, to a predetermined format, the image data of the plurality of image frames which image data is stored in said storing means;
a liquid crystal panel in which a plurality of pixels, whose transmission density is changeable in predetermined gradations, are arranged in a matrix form;
display control means for color-separating each image of the plurality of image frames into an R color density, a G color density and a B color density in accordance with the image data edited by said editing means, and for displaying the R color density, the G color density and the B color density on said liquid crystal panel; and
a light source section emitting R, G and B colors which are transmitted through respective pixels of said liquid crystal panel and which are used for exposing a transmitted image onto the sheet-shaped photographic printing paper.

8. A photographic printer according to claim 7, wherein said light source section includes a first high luminance reflecting type LED which emits B color, a second high luminance reflecting type LED which emits R color, and a third high luminance reflecting type LED which emits G color.

9. A photographic printer according to claim 8, wherein the high luminance reflecting type LED has a light emitting element and a paraboloidal mirror surface which reflects light from the light emitting element.

10. A photographic printer according to claim 9, wherein the light emitting element has a light emitting surface, and in the first high luminance reflecting type LED, the light emitting surface is disposed at a position which is offset from a focal point position of the mirror surface so that a central portion of light reflected from the mirror surface is parallel light.

11. A photographic printer according to claim 10, wherein said second exposure section further comprises:
an exposure lens which projects, as exposure light and onto the sheet-shaped photographic printing paper, light transmitted through said liquid crystal panel, and which images the light at a predetermined magnification.

12. A photographic printer according to claim 8, wherein the first high luminance reflecting type LED is disposed on an exposure optical axis of said liquid crystal panel so as to emit light along said exposure optical axis, and said second exposure section further comprises first and second dichroic mirrors which are disposed on said exposure optical axis so as to correspond to the second high luminance reflecting type LED and the third high luminance reflecting type LED, and the second high luminance reflecting type LED and the third high luminance reflecting type LED are disposed so as to emit light in a direction orthogonal to said exposure optical axis, and the respective lights emitted from the second high luminance reflecting type LED and the third high luminance reflecting type LED are incident on said liquid crystal panel along said exposure optical axis via the first and second dichroic mirrors.

* * * * *